(12) United States Patent
Delfosse et al.

(10) Patent No.: US 7,700,877 B2
(45) Date of Patent: Apr. 20, 2010

(54) WIRE MANAGEMENT SYSTEM WITH INTEGRATED DIN RAIL AND SELECTIVELY ACCESSIBLE WIRE

(75) Inventors: Brian C. Delfosse, Milwaukee, WI (US); David J. Brockman, Belgium, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 408 days.

(21) Appl. No.: 11/842,721

(22) Filed: Aug. 21, 2007

(65) Prior Publication Data

US 2009/0050345 A1   Feb. 26, 2009

(51) Int. Cl.
*H02G 3/04* (2006.01)
(52) U.S. Cl. ............... 174/72 A; 174/95; 174/97; 174/101; 439/532
(58) Field of Classification Search ........... 174/72 A, 174/68.1, 95, 97, 68.3, 101, 99 R; 439/532, 439/716, 718, 527
See application file for complete search history.

(56) References Cited

U.S. PATENT DOCUMENTS

| | | | | |
|---|---|---|---|---|
| 4,924,036 A | * | 5/1990 | Shyu | ............ 174/97 |
| 5,525,079 A | | 6/1996 | Johnson | |
| 6,002,089 A | * | 12/1999 | Hemingway et al. | ........ 174/97 |
| 6,156,977 A | * | 12/2000 | Benito-Navazo | ............ 174/97 |
| 6,484,997 B1 | | 11/2002 | Edwards et al. | |
| 6,667,876 B1 | | 12/2003 | Neeff | |
| 7,470,859 B1 | * | 12/2008 | Gretz | ......... 174/72 A |
| 7,514,630 B2 | * | 4/2009 | Anderson | ......... 174/72 A |
| 7,592,546 B2 | * | 9/2009 | Johansson | ........ 174/95 |
| 2005/0079773 A1 | | 4/2005 | Prokup et al. | |

OTHER PUBLICATIONS

LSC frames.
Amphenoi Pcd, Wire Manager System (WMS).
IBOCO, Omega 3-500 pre-cut 19" DIN rail pieces, Machine Design, S32—Aug. 5, 2004.
IBOCO Brochure.

* cited by examiner

*Primary Examiner*—Dhiru R Patel
(74) *Attorney, Agent, or Firm*—Qualres & Brady LLP; Alexander R. Kuszewski

(57) ABSTRACT

A wiring system includes a first mounting bracket and a second mounting bracket having respective mounting flanges configured to secure the first and second mounting brackets to a mounting surface. The first and second mounting brackets extend away from the mounting surface to a distal end where a hinge is formed. The wiring system also includes a DIN rail supported above the mounting surface by the first and second mounting brackets through the respective hinges such that the DIN rail is rotatable about the hinges along an axis of rotation extending between the first and second mounting brackets to provide access to a wire passage extending parallel to the axis of rotation under the DIN rail and through the first and second mounting brackets.

30 Claims, 9 Drawing Sheets

WIRE MANAGEMENT SYSTEM WITH INTEGRATED DIN RAIL AND SELECTIVELY ACCESSIBLE WIRE

CROSS-REFERENCE TO RELATED APPLICATIONS

--

Statement Regarding Federally SPONSORED RESEARCH OR DEVELOPMENT

--

BACKGROUND OF THE INVENTION

The present invention relates generally to wiring systems and, more particularly, to a wire management system that includes a DIN rail elevated above a wire. The DIN rail is designed to pivot to provide access to the wire.

The electrical wiring guilds span a wide variety of applications including electrical substation panels, military vehicles and installations, and manufacturing facilities, to name but a few. For example, referring to FIG. 1, a common electrical substation panel 10 includes a rear panel 11 surrounded by a top panel 12, opposing side walls 14, 16, and a bottom panel 18. As is common in many panel designs, a top wire duct 20 is secured to the top panel 12, opposing side wire ducts 22, 24 are secured to the side walls 14, 16, and a bottom wire duct 26 is secured near the bottom panel 18 above a ground bus bar 28. As such, wires can be routed around the periphery of the entire panel 10 using the ducts 20, 22, 24, 26.

Within the interior of the panel 10, a wide variety of electrical, electro-mechanical, and digital components, generally designated 30, are arranged by being mounted to or in the rear panel 11. These components may, for example, include relays 32, terminal blocks 34, power analysis and communications systems 36, and a wide variety of other components depending upon application, design, and engineering constraints. Larger components, such as power analysis and communications systems 36 or switches (not shown), are typically mounted in cut-outs formed in the rear panel 11. On the other hand, smaller components, such as terminal blocks 34 and smaller relays 32, are often mounted on standardized rails that are secured to the rear panel 11. In particular, the rails are designed to conform to standard arrangements such as maintained by the International Standards Organization (ISO). Of all standard rail configurations maintained by the ISO, one particular rail commonly referred to as a "DIN" rail, which is an acronym for "Deutsches Institut für Normung", a German standardization body and member of the ISO, is widely, and nearly exclusively, used in such electrical wiring applications. That is, DIN rails 37 are the dominate rail configuration utilized for such electrical wiring applications as are commonly housed in panels 10, and the like.

Between each row of components 30, additional wire ducts 38 are generally mounted transversely across the rear panel 11 to receive wires running to and from the components 30 arranged throughout the rear panel 11. In this regard, the additional wire ducts 38 provide an easily accessible thoroughfare to and from the top wire duct 20, opposing side wire ducts 22, 24, bottom wire duct 26, and ground bus bar 28.

The complexity of wiring these systems is ever increasing as the integration of electrical, electro-mechanical, and digital components 30 become increasingly sophisticated and complex. At the same time, the area within which these components 30 must be integrated and managed is continuously decreasing. For example, in the case of electrical substation panels, two common panel sizes are 40 inches by 60 inches and 40 inches by 40 inches. In panel materials alone, the cost for a 60 inch by 40 inch panel can be nearly 50% more than a panel that is 40 inches by 40 inches. Accordingly, even in applications where there is sufficient room to accommodate a larger panel, customers prefer small panel sizes.

In an effort to reduce the areas needed to fit such components, the transversely extending wire ducts 38 have sometimes been foregone in favor of hand-wrapped bundles of wires. However, these designs are generally undesirable due to the increased wiring/manufacturing costs and difficulty accessing or replacing wired components after the manufacturing process. Accordingly, the use of additional wire ducts 38 has remained standard within numerous manufacturing/wiring industries.

In an attempt to reduce the overall space needed to adequately accommodate the components 30 and associated wire ducts 38, some manufacturers have mounted DIN rails 37 to the wire ducts 38. In particular, the DIN rails 37 have been mounted directly on covers 40 that are snap fitted onto the wire ducts 38. Accordingly, a single wire duct 38 mounted on the rear panel 11 and under the DIN rail 37 can replace the two wire ducts 38 that are typically mounted above and below a DIN rail 37 in a traditional panel design.

While such systems can reduce some of the space required to accommodate components mounted on a DIN rail 37, they suffer from numerous drawbacks. First, in order to access wires within the wire duct 38, the cover 40 must be removed. However, since the components 30 are mounted to the cover 40, the cover 40 is restricted by the associated wires from being entirely removed. Second, as stated, the wire duct covers 40 are typically snap fitted onto the wire ducts 38. In this regard, the weight of components 30 mounted to the cover 40 is often sufficient to detach the cover 40 from the wire duct 38. Accordingly, the components mounted on the detached cover 40 will dangle from the wires leading to or from the components. This may create undesirable, if not unsafe, conditions within the panel 10.

Alternatively, some manufacturers have designed elevated DIN rails that are mounted on u-brackets. In this case, the wires leading to and from the components mounted on the elevated DIN rail may pass under the DIN rail within the space provided by the u-brackets. However, these systems still require significant space between components located above or below the u-brackets in the panel so that wires passing under the DIN rails can be accessed during wiring or field replacements. Furthermore, these systems do not provide any wiring conduit within which to confine the wires running under the u-bracket. As such, tie-wrapped wire bundles are typically required, which add to wiring/manufacturing costs.

Accordingly, some manufacturers have created systems that include enclosed wire passages that are accessible through a hinged top that supports the elevated DIN rail. For example, one such system includes hinges located at an end of the DIN rail. In this regard, one end of the DIN rail can be swung out from the rear panel 11 through the hinge located at the other end of the DIN rail to provide access to the enclosed wire passage located under the DIN rail. However, these systems place significant stress upon the hinge because the weight of the cover, DIN rail, and all components mounted on the DIN rail is applied to a single hinge. Accordingly, it is not uncommon for the hinges in these systems to fail after repeated use. In particular, if the cover and DIN rail are left in the open position for an extended length of time, such as is required during wiring of the panel, the hinge will bend and/or break and require replacement. This leads to significant cost in materials and labor because the components mounted on the DIN rail must be removed along with the wire passage and cover, and then remounted on a new DIN rail, cover, and wire passage assembly. Furthermore, these systems require excessive amounts of slack wire and/or circuitous wiring routes in order to allow the DIN rail to swing through the wide rotational path required to reach the open position without the wires restricting movement of the DIN rail.

In order to reduce the potential for damaging or breaking the hinge and to alleviate the need for excessive slack or convoluted wiring routes, some wiring systems include hinges that run parallel with the wire. For example, one such wiring system includes a DIN rail mounted above an enclosed channel formed by a trapezoidal cover that engages a mounting through a pair of snap-in hinges. However, this design also includes a number of drawbacks. First, the use of snap-in hinges is undesirable in many applications because they merely rely on frictional forces to secure the DIN rail and associated components. In this regard, in electrical panels, where components are typically mounted on a vertically extending panel wall, the weight of the DIN rail and associated components may be sufficient to dislodge one or more of the snap-in hinges. Accordingly, in a manner similar to the above-described cover-mounted DIN rails, undesirable, if not unsafe, conditions may be created by dangling components. Additionally, when wiring components to the elevated DIN rail and attempting to route wires into the wire passage, the wiring process may become particularly arduous. That is, since the wire is enclosed, wires must be individually fed through small slots formed in the trapezoidal cover and then routed through the wire. Furthermore, when mounted on a vertically extending wall or panel, the trapezoidal cover will either snap shut or have a tendency to dislodge from the mounting, depending upon which hinge is opened. In this regard, workers attempting to route wires through the wire must hold the trapezoidal cover in the open position in order to access the wire and feed wires therethrough.

Therefore, it would be desirable to have a wire management system that reduces the amount of space needed to accommodate components located within a given area. Furthermore, it would be desirable to have a wire management system that is not prone to accidental disassembly or damage. Additionally, it would be desirable to have a system that provides adequate access to components and wires to accommodate wiring procedures during and after the manufacturing process.

BRIEF SUMMARY OF THE INVENTION

The present invention overcomes the aforementioned drawbacks by providing a wire management system that includes a DIN rail elevated on a pair of mounting brackets above a wire that is accessible by rotating the DIN rail about pivot points formed by the mounting bracket. The DIN rail can be secured in an open or closed position to provide extended access to the wire and secure the DIN rail against damage caused by accidental movement with respect to the mounting brackets.

In accordance with one aspect of the invention, a wiring system is disclosed that includes a first mounting bracket and a second mounting bracket having respective mounting flanges configured to secure the first and second mounting brackets to a mounting surface. The first and second mounting brackets extend away from the mounting surface to a distal end where a hinge is formed. The wiring system also includes a DIN rail supported above the mounting surface by the first and second mounting brackets through the respective hinges such that the DIN rail is rotatable about the hinges along an axis of rotation extending between the first and second mounting brackets to provide access to a wire passage extending parallel to the axis of rotation under the DIN rail and through the first and second mounting brackets.

Various other features of the present invention will be made apparent from the following detailed description and the drawings.

DETAILED DESCRIPTION OF THE INVENTION

Figure 1:
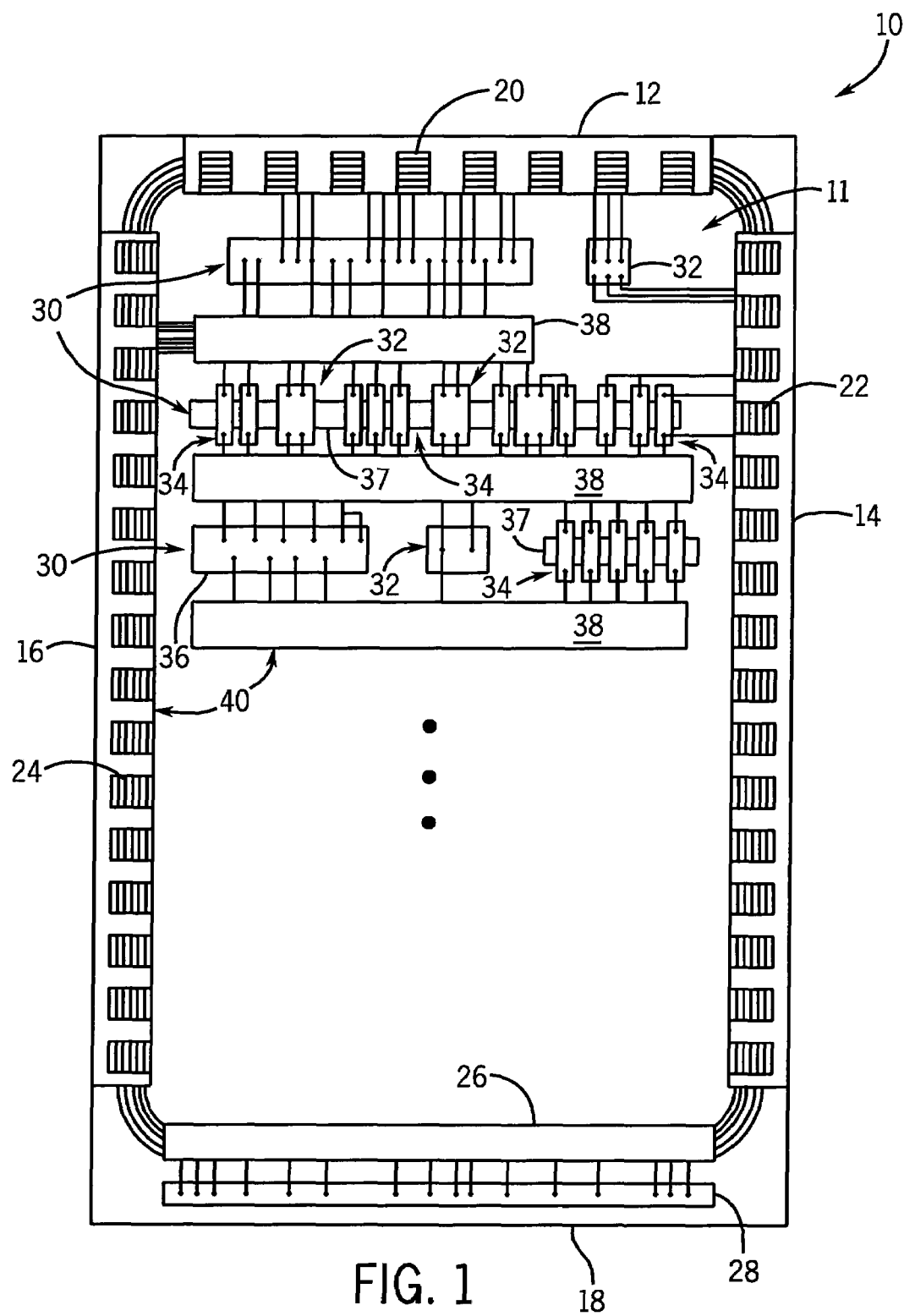
FIG. 1 is rear elevational view of a control panel wired using traditional wiring systems.
Figure 2:
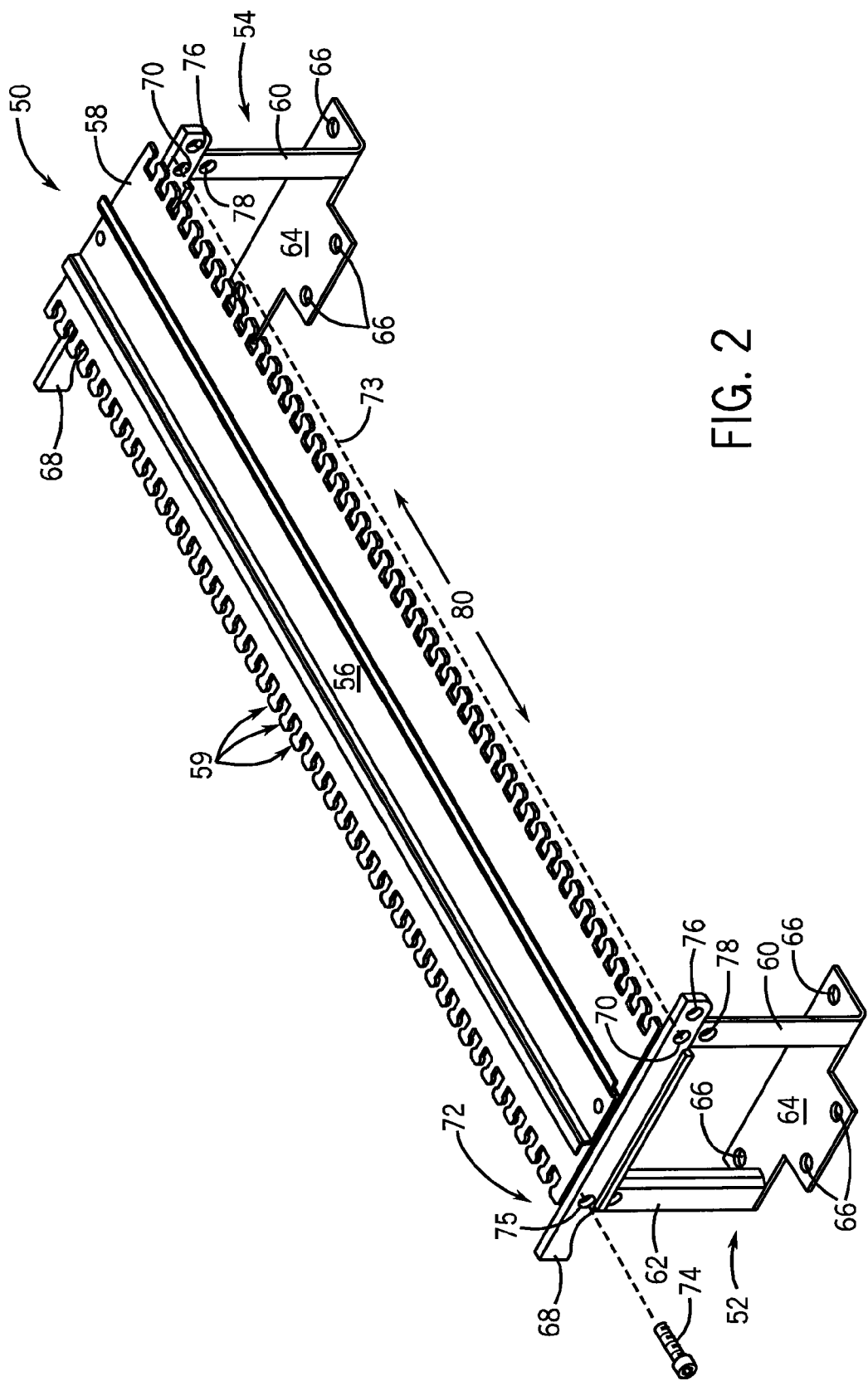
FIG. 2 is a perspective view of a wiring system in accordance with the present invention.

Referring now to FIG. 2, a wire management system 50 includes a pair of mounting brackets 52, 54 that support a DIN rail 56 through a support plate 58. As will be described, the support plate includes a plurality of keys 59 configured to receive and secure wires positioned therebetween. In particular, the mounting brackets 52, 54 include a pair of posts 60, 62 that extend up from a mounting flange 64. The mounting flange 64 includes a plurality of holes 66 configured to receive bolts (not shown) or other means to secure the mounting flange to a mounting surface. In this regard, the posts 60, 62 extend away from the mounting flange 64 to a distal end of the mounting brackets 52, 54 where a crossbar 68 is supported.

The crossbar 68 is supported by the posts 60, 62 though a hinge 70 formed at the distal end of one of the posts 60 as well as a lock 72 formed at the distal end of the other post 62. An axis of rotation 73 is formed that extends between the mounting brackets 54. More particularly, the axis of rotation 73 extends between the hinge points 70 formed at the intersection of the post 60 and crossbar 68.

Figure 3:
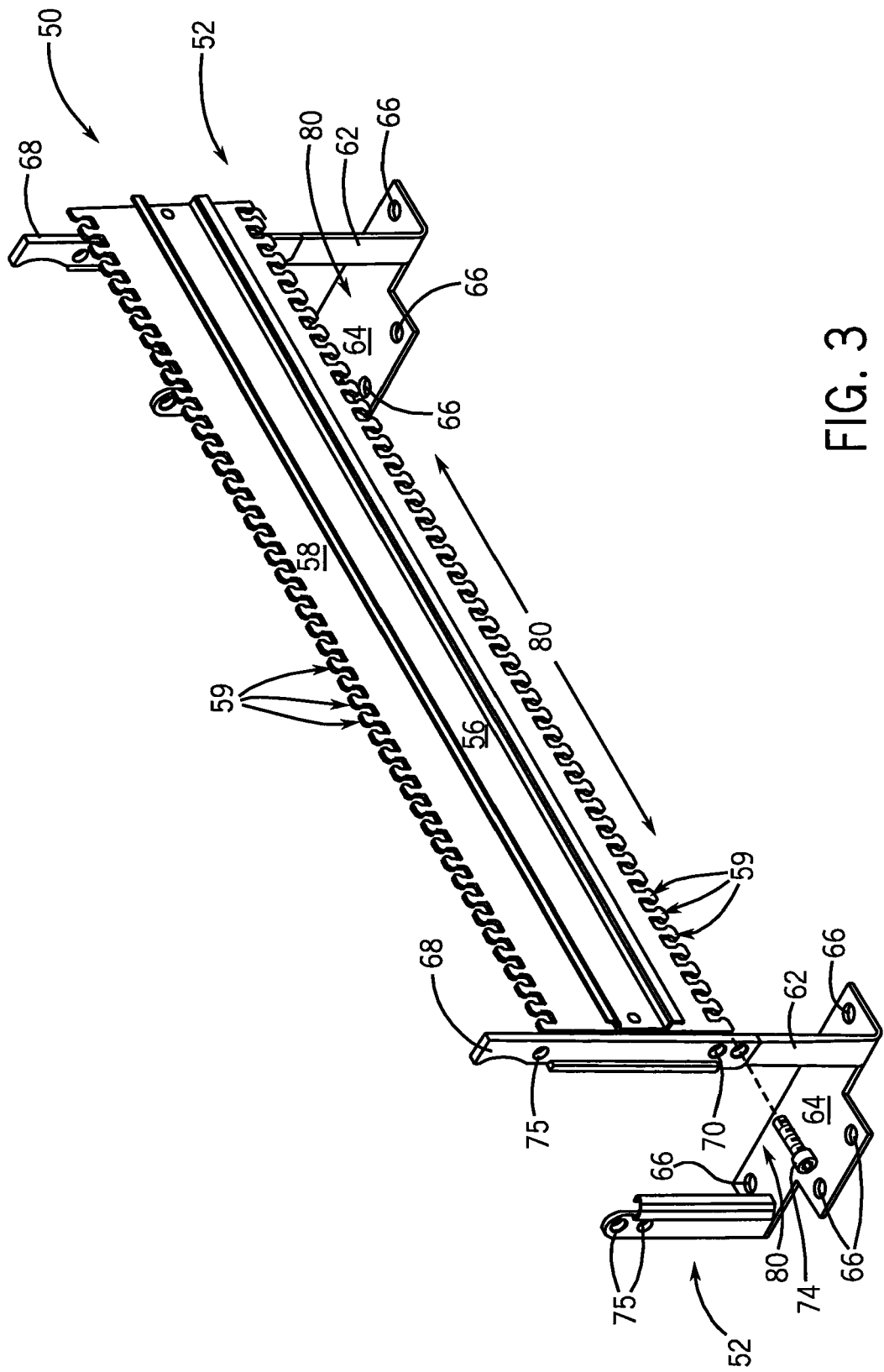
FIG. 3 is a perspective view of the wiring system of FIG. 1 with a DIN rail rotated to provide access to an integrated wire passage.

The hinges 70 rotatably fix the crossbar 68 such that the DIN rail 56 cannot be accidentally disengaged from the posts 60. To secure the DIN rail 56 against accidental rotational movement, the lock 72 may be engaged. For example, the lock 72 may include a threaded shaft 74 or other suitable locking device designed to pass through a set of holes 75 formed in the crossbar 68 and the post 62. Referring to FIG. 3, the crossbar 68 also includes another hole 76 formed proximate to the hinge 70 that can be aligned with a hole 78 formed below the hinge 70 in the post 60. In this regard, the crossbar 68 can be locked in the rotated position of FIG. 3 to provide access to a wire passage 80 formed under the support plate 58 and extending coaxially with the axis of rotation 73 and through the mounting brackets 52.

Referring to FIGS. 2 and 3, any din-rail compatible component can be easily mounted to the DIN rail 56 by conventional means when in the "closed" position with the crossbar 68 locked to the post 62. Wires can then be attached to the mounted component and the threaded shaft 74 removed from the lock 72. In this regard, the crossbar 68, DIN rail 56, and any component mounted thereon can be rotated into the "open" position to expose the wire passage 80. As stated, the crossbar can then be locked using the threaded shaft 74 by passing it through the hole 76 formed in the crossbar 68 and the hole 78 formed in the post 60. Accordingly, wires can be easily routed through the wire passage 80 and through the mounting brackets 52 by passing the wires between the posts 60, 62. Furthermore, since the wire 80 is not enclosed, by rotating the support plate 58 and DIN rail 56 into the open position, access is provided to the wire from a variety of positions and angles.

As stated, the support plate 58 and DIN rail 56 can be secured in either the closed or open position to protect against accidental or potentially damaging movement. Furthermore, when in the open position, free and clear access is provided to the wire passage 80 so that wires can be easily threaded along the wire passage 80 and between the posts 60, 62 into additional wire management system 10 or traditional wire conduits. After the manufacturing process, access to the wire passage 80 is readily available by rotating the support plate 58 and DIN rail 56 to the open position. In this regard, full rotation into the open position is permitted with only minor amounts of slack in wires running along the wire passage 80, such as is commonly necessary to allow the manufacturing process to be completed.

As stated, the plurality of keys 59 facilitates rotation of the DIN rail 56 when wired components are mounted thereon. In particular, the keys 59 are designed to receive wires extending from the components mounted on the DIN rail 56 and into the wire 80. Accordingly, when the DIN rail 56 is rotated to the open position from the closed position, or vice versa, the keys 59 hold the wires in place. That is, the keys 59 fix the position of the wires with respect to the mounted components as the DIN rail is rotated and; hence, protect the wires from undue stress that could otherwise loosen or remove a wire from the component to which it is connected.

It should be noted that the wire management system 50 allows for modular expansion by aligning the wires 80 of additional systems. In this regard, the mounting brackets 52 of adjacent systems 50 may be aligned to thereby align the wires 80. This modular expandability of the wire management system 50 allows the wire management system 50 to accommodate a variety of designs and configurations. Additionally or alternatively, it is contemplated that the overall length of the wire management system 50 may be varied. In the case of wire management systems 50 that are designed to span significant lengths, it is contemplated that one or more additional mounting brackets (not shown) may be included to support the DIN rail 56 between the two mounting brackets 52, 54 arranged at each end of the wire management system 50. Accordingly, it is contemplated that the DIN rail 56 may span a significant distance while still being adequately supported.

Figure 4:
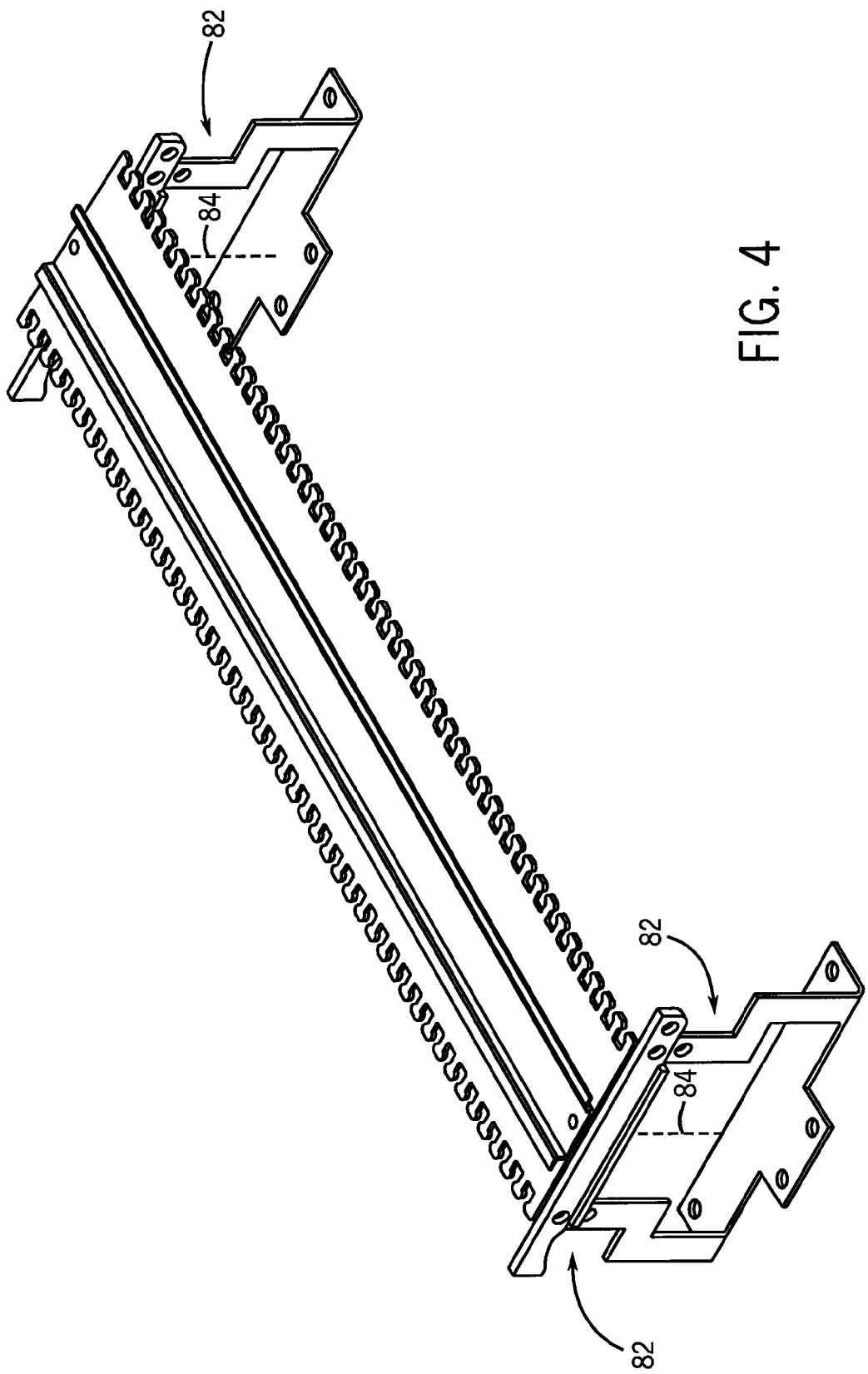
FIG. 4 is a perspective view of a wiring system in accordance with the present invention having a reduced rotational swing.

Referring now to FIG. 4, it is contemplated that the size of the support plate 58 may be reduced in order to reduce the turning radius of the support plate 58 and DIN rail 56 as they are moved from the closed to the open position. In this regard the posts 60, 62 may each include a jog 82 so that the hinge 70 is moved inward toward a center point 84 of the wire passage 80 between the posts 60, 62. Accordingly, components or additional wire management systems can be mounted in close proximity above or below the wire management system 10 without interfering with the rotation of the support plate 58 and DIN rail 56 because the jogs 82 provide a space for the support plate 58 and DIN rail 56 to rotate into without encountering components or additional wire management systems that are in close proximity.

Figure 5:
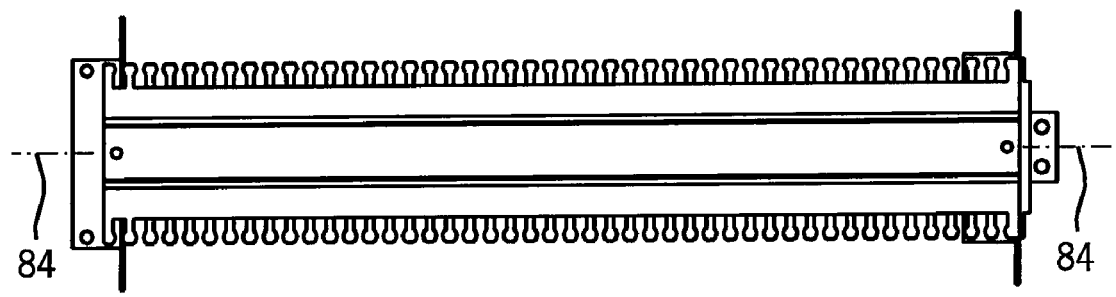
FIG. 5 is a plan view of a wiring system in accordance with the present invention having a centralized rotational access.

Extending the concept described with respect to FIG. 5 and referring now to FIG. 5, the axis of rotation 73 can be moved to the center point 84 of the wire passage 80 between the posts 60, 62. By moving the axis of rotation 73 into the center point 84 of the wire passage 80, the clearance required above or below the wire management system 10 for the support plate 58 and DIN rail 56 to be rotated between the closed and open positions is minimized. However, due to the open configuration of the wire management system 50 (as opposed to systems including enclosed wires), access to the wire passageway 80 is still readily available.

Figure 6:
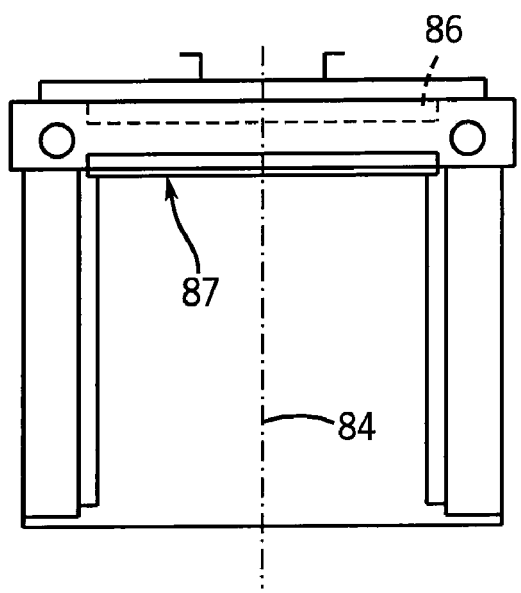
FIG. 6 is a side elevational view of the wiring system of FIG. 5.

Referring now to FIG. 6, it is contemplated that the crossbar 68 may be integrated with the posts 60, 62 when the axis of rotation 73 is moved into the center point 84 of the wire passage 80. Furthermore, it is contemplated that in order to restrict the support plate 58 and DIN rail 56 against unwanted rotation, a lock in the form a threaded shaft 86 or other locking mechanism may be utilized. For example, the threaded shaft 86 may be designed to be positioned in holes 87 that extend through the hinge 70 and within the crossbar 68. In a similar manner, the threaded shaft 74 may be used to lock the support plate 58 and DIN rail 56 when rotated into the open position.

Figure 7:
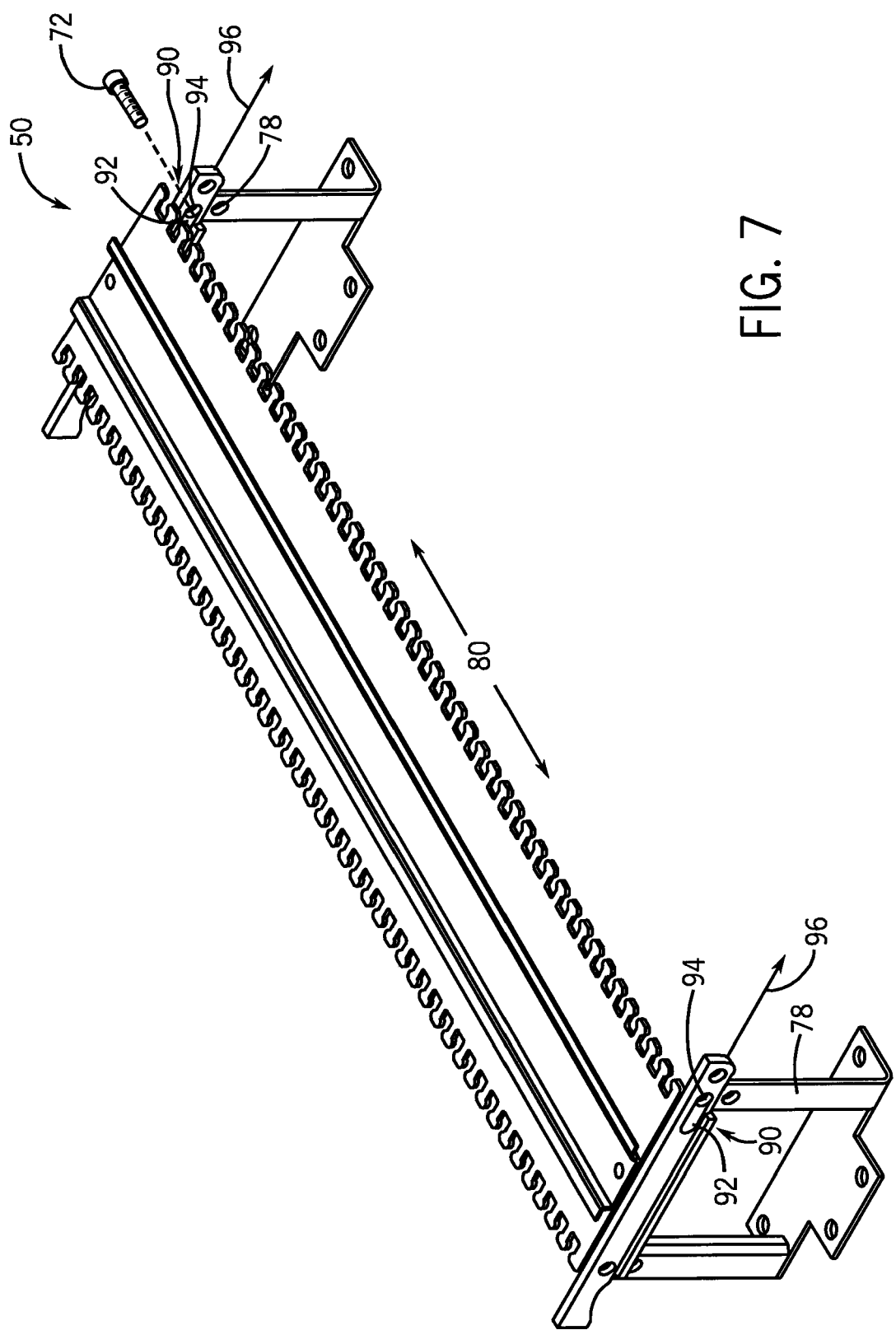
FIG. 7 is a perspective view of a wiring system in accordance with the present invention having a dual-action, slide and rotational movement configured to reduce a rotational swing of the wiring system.
Figure 8:
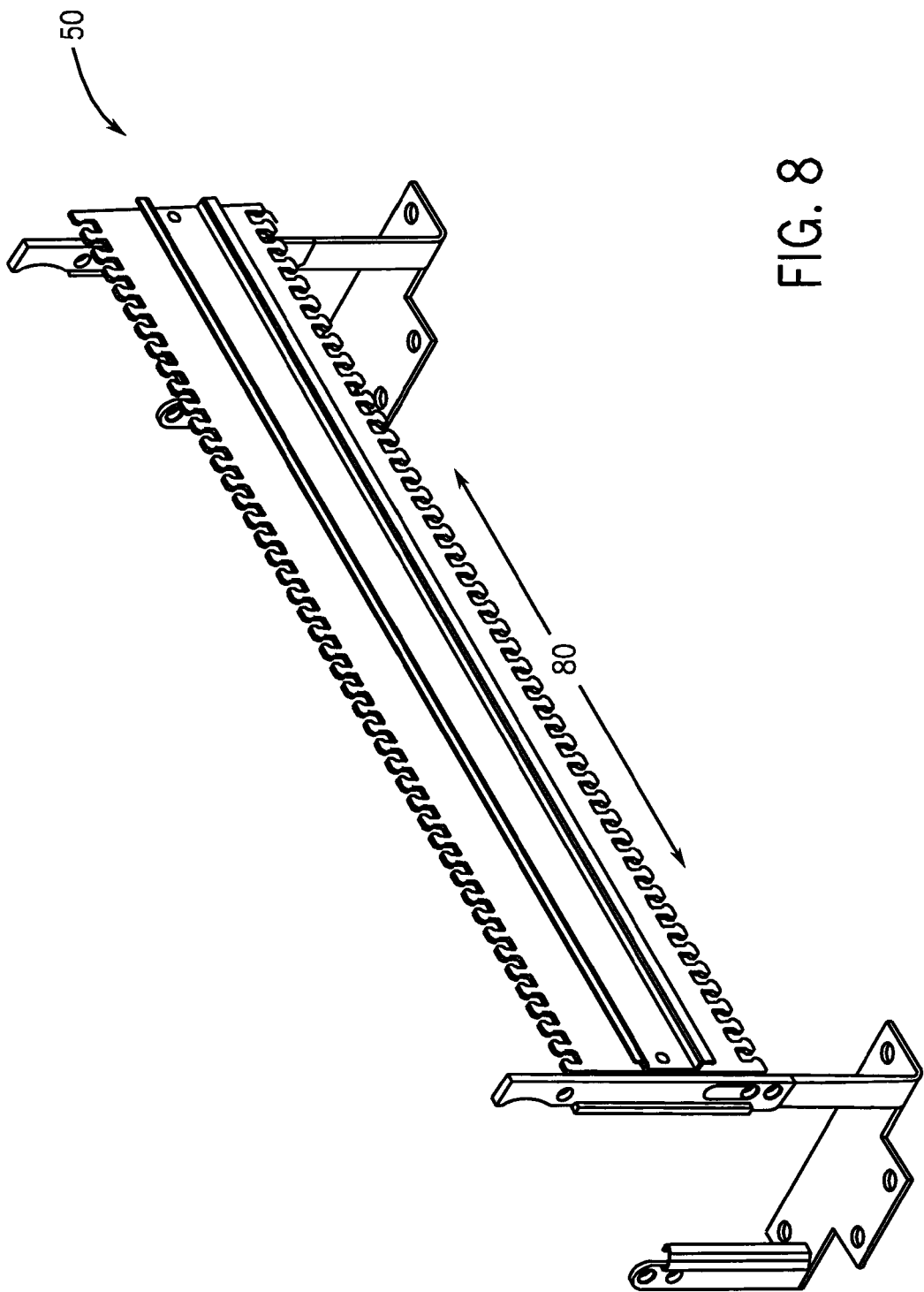
FIG. 8 is a perspective view of the wiring system of FIG. 7.

Referring now to FIGS. 7 and 8, it is also contemplated that a sliding mechanism 90 may be combined with any of the above-described systems to further reduce or adjust the rotational swing of the support plate 58 and DIN rail 56 as they are rotated between the open and closed positions. Specifically, the sliding mechanism 90 may include an elongated slot 92 formed in the crossbar 68 that is coupled through a hinge pin 94 formed in the post 60. Accordingly, the crossbar 68 may slide with respect to the mounting brackets 52 along a direction generally indicated by arrow 96. Accordingly, when the support plate 58 and DIN rail 56 are rotated into the open position, the end of the crossbar 68 and support plate 58 do not extend as far out beyond the distal end of the mounting brackets 52 as the wire management systems 50 described above. By moving the hole 78 formed on the post 60 closer to the mounting flange 64, the lock will accommodate the displacement formed by sliding the support plate 58 and DIN rail 56 before rotating them into the open position.

Figure 9:
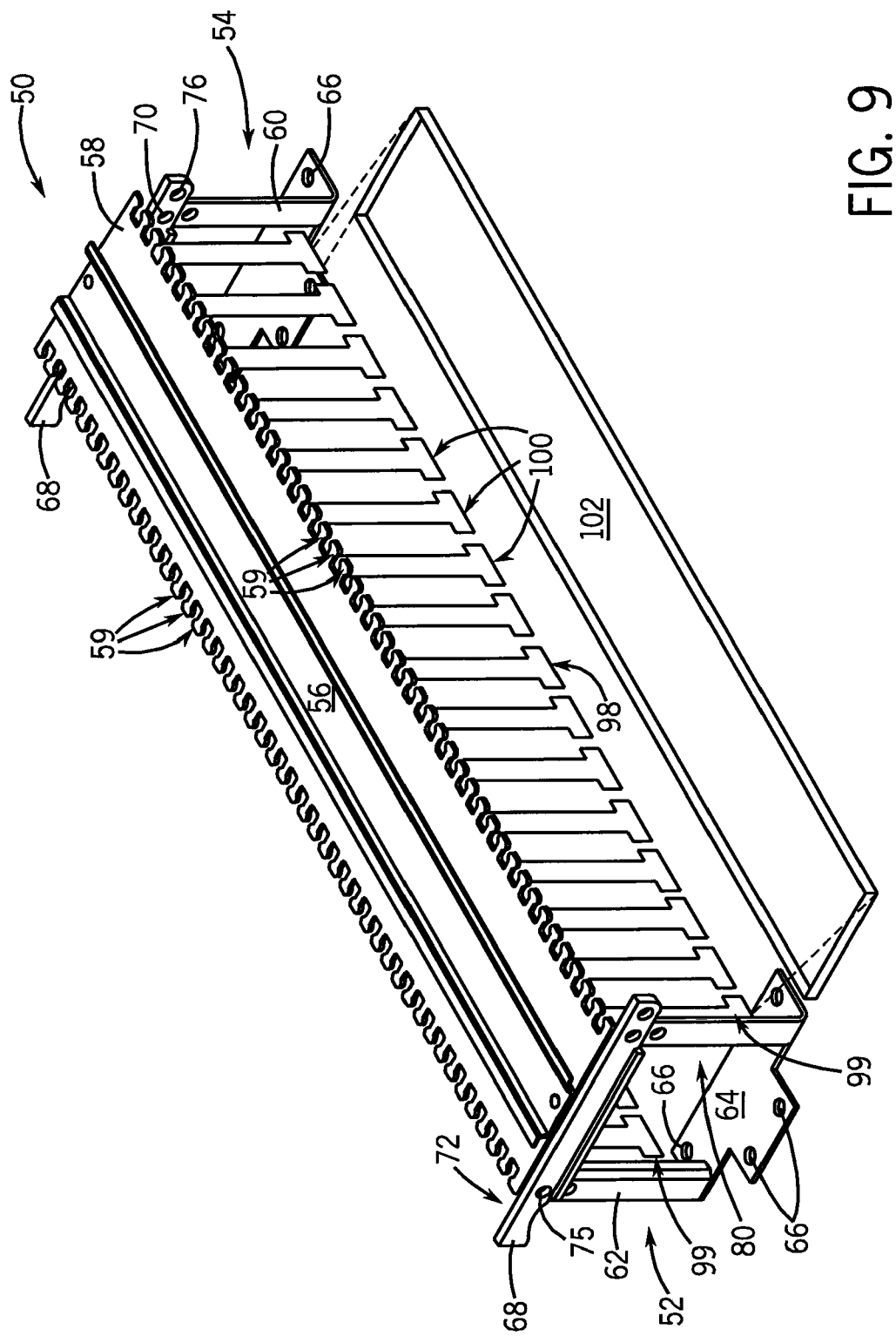
FIG. 9 is a perspective view of the wiring system of FIG. 2 with additional wire management components engaged therewith.

Referring now to FIG. 9, in accordance with one embodiment, it is contemplated that additional wire management components may be coupled with the wire management system 50. For example, a wire duct 98 may be mounted to the support plate 58 so as to extend into wire passage 80 and create opposing walls 99 enclosing the wire passage 80. In this regard, the keys 59 extending from the support plate 58 work in concert with corresponding keys 100 of the wire duct 98 to secure wires extending from components mounted on the DIN rail 56 as they enter the wire passage 80. Additionally, it is contemplated that a cover 102 may be designed to engage the keys 100 forming the walls 99 of the wire duct 98 to further secure the wires extending through the wire duct 98. In this regard, it is contemplated that the wire duct 98 and cover 102 are rotatable with the support plate 58 between the above-described open and closed positions. That is, the wire duct 98 and optional cover 102 are sized to freely rotate with the support plate 58 between the above-described open and closed positions.

Figure 10:
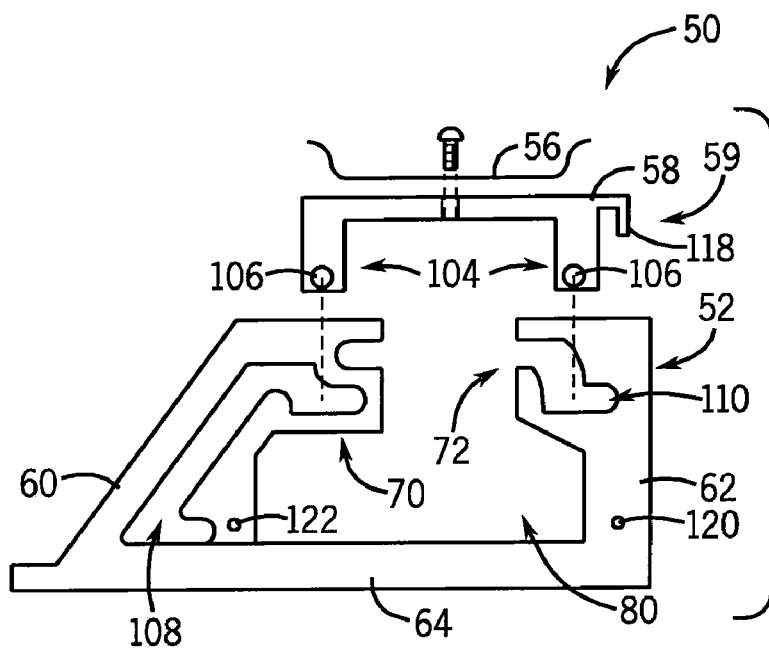
FIG. 10 is a side-elevational, exploded, view of another configuration of a wiring system in accordance with the present invention with a support plate and DIR rail in a closed position.

Referring now to FIG. 10, the above-described wire management system 50 may be modified to have a dual-action, hinge and slide configuration. Specifically, the support plate 58 may include a pair of legs 104 extending from each end. Extending from each leg 104 is a pin 106 that is configured to extend through either a slide passage 108 formed in the first post 60 or lock passage 110 formed in the second post 62. In this regard, the pins 106 form supports that, as will be described, support the DIN rail 56.

Figure 11:
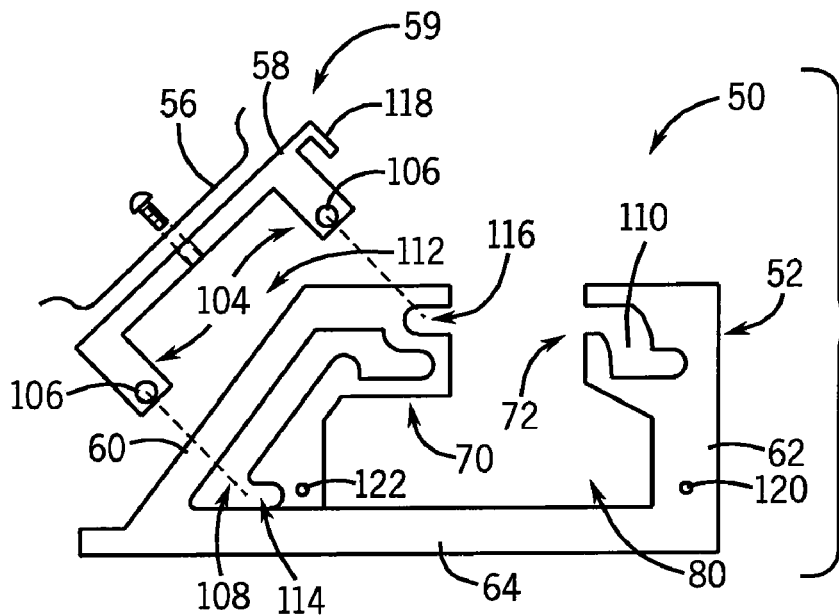
FIG. 11 is a side-elevational, exploded, view of the wiring system of FIG. 10 with the support plate and DIN rail in an open position to provide access to an integrated wire passage.

Referring now to FIGS. 10 and 11, in operation, the support plate 58 and associated legs 104 can be moved from a closed position illustrated in FIG. 10 to an open position illustrated in FIG. 11 to provide access to the integrated wire passage 80. To do so, the support plate 58 and legs 104 are moved in a direction generally indicated by arrow 112 in FIG. 11. Specifically, as the support plate 58 and legs 104 are moved away from the second post 62, the pins 106 are guided within the slide passage 108 and locking passage 110 upwardly. Accordingly, the pin 106 arranged within the locking passage 110 is permitted to be removed therefrom and rotate further upward as the pin 106 arranged in the slide passage 108 slides downward toward the mounting flange 64. At the base of the slide passage a receptacle 114 is formed to receive the pin 106. Similarly, a receptacle 116 is arranged at the top of the post 60 to receive the other pin 106. In this regard, the support plate 58 and legs 104 can be securely positioned in the open position to permit simultaneous access to components mounted on the DIN rail 56 and wires extending into the integrated wire passage 80.

While it is contemplated that keys 59 may be formed along the extent of the support plate 58, in the configuration illustrated in FIGS. 10 and 11, it is further contemplated that an additional wire holder 118 may extend from the support plate 58 proximate to the leg 104 and pin 106 designed to the locking passage 110. In this regard, wires extending from components mounted on the DIN rail 56 can be easily arranged to extend into the integrated wire passage 80 and, thereafter, are secured against undesired movement as the support plate 58 and legs 104 are rotated between the closed position shown in FIG. 10 and the open position shown in FIG. 11. Furthermore, it is contemplated that one or more holes 120, 122 may be formed in the posts 60 62 to receive a wire-way base bar (not shown) extending parallel to the support plate 58 between the mounting brackets 52, 54. By arranging a wire-way base bar extending between the mounting brackets 52, 54, additional wire organizers, such as key organizers, may be arranged thereon and may be even be hinged to rotate on the wire-way base bars.

The above-described wire management system provides numerous advantages over traditional wire management systems. First, the above-described system 50 includes a hinged and elevated DIN rail 56 that can be secured against accidental dislodgement from the mounting bracket 52 because the hinge system 70 fixes the post 60 with the crossbar 68. Furthermore, by aligning the axis of rotation 73 coaxially with the extension of the wire 80 through the mounting brackets 52, and not enclosing the wire 80 in a cover, ready access is provided to the wire at various positions and angles. Additionally, by including various locking systems 72, 74, 76, 78, 86, the wire management system 50 is protected against accidental movement or rotation. In this same regard, prolonged access to the wire passage 80 is provided without the need for manual support of the DIN rail 56. Also, the overall design of the system 50 allows for modular expansion by aligning the wires 80 of additional systems 50 coaxially.

The present invention has been described in terms of the preferred embodiments, and it should be appreciated that many equivalents, alternatives, variations, and modifications, aside from those expressly stated, are possible and within the scope of the invention. Therefore, the invention should not be limited to a particular described embodiment.

We claim:

1. A wiring system comprising:
a first mounting bracket and a second mounting bracket, each mounting bracket having respective mounting flanges configured to secure the first and second mounting brackets to a mounting surface and first and second posts extending away from the mounting surface to a distal end of the first and second mounting brackets, respectively;
a hinge formed at the distal end of each of the first and the second mounting brackets;
and a DIN rail supported above the mounting surface by the first and second mounting brackets through the respective hinges such that the DIN rail is rotatable about the hinges along an axis of rotation extending between the first and second mounting brackets to provide access to a wire passage extending parallel to the axis of rotation under the DIN rail and through the first and second mounting brackets.

2. The wiring system of claim 1 wherein the first and the second posts are separated by the wire passage and wherein the hinges are formed in the distal end of the first post.

3. The wiring system of claim 2 further comprising first and second crossbars configured to engage the hinges at the first post of the first and second mounting brackets, respectively, and extend transversely across the first and second mounting brackets, respectively, to engage the second post of the first and second mounting brackets, respectively.

4. The wiring system of claim 3 wherein the DIN rail is supported by the first and second mounting brackets through the first and second crossbars.

5. The wiring system of claim 4 further comprising a lock formed at the distal end of the second post and configured to engage the crossbar to lock the DIN rail against rotation about the hinges.

6. The wiring system of claim 2 further comprising a lock formed at the distal end of the second post and configured to selectively secure the DIN rail against rotation about the hinges formed at the distal ends of the first post.

7. The wiring system of claim 2 further comprising a support plate extending between the first and second mounting brackets and supported by the distal end of the first and second posts of the first and second mounting brackets and wherein the DIN rail is mounted to the support plate.

8. The wiring system of claim 7 further comprising a pin extending from at least one end of the support plate and a lock formed at the distal end of the second post to receive the pin and secure the DIN rail against rotation about the hinges formed at the distal ends of the first post.

9. The wiring system of claim 7 further comprising a plurality of keys extending along a periphery of the support plate and configured to receive and secure wires extending from components mounted on the DIN rail into the wire passage.

10. The wiring system of claim 9 wherein the support plate and plurality of keys are configured to rotate with the DIN rail about the hinges to provide access to the wires.

11. The wiring system of claim 10 wherein the plurality of keys are configured to secure the wires extending from the components mounted on the DIN rail into the wires as the DIN rail and support plate are rotated about the hinges.

12. The wiring system of claim 7 further comprising a first pin and a second pin extending from the support plate and wherein the first and second posts include respective passages formed therein to receive the first pin and the second pin respectively to permit a hinge-and-slide action to move the support plate between a closed position restricting access to the wire passage and an open position providing unrestricted access to the wire passage.

13. The wiring system of claim 1 wherein the first and second posts are separated by the wire passage and support a crossbar extending between the first and second posts.

14. The wiring system of claim 13 wherein the hinges are formed substantially midway along the crossbar between the first and second posts.

15. The wiring system of claim 14 further comprising a support plate mounted between the first and second mounting brackets through the hinges to support the DIN rail therebetween and allow the DIN rail to selectively rotate toward the first post and the second post.

16. The wiring system of claim 1 wherein the DIN rail is configured to slidingly engage the hinges through first and second crossbars engaged with the first and second mounting brackets, respectively, and configured to selectively slide and rotate over the hinges to provide access to the wire passage.

17. The wiring system of claim 1 further comprising:
a third mounting bracket and a fourth mounting bracket, each of the third and fourth mounting brackets having respective mounting flanges configured to secure the third and fourth mounting brackets to the mounting surface and the first and second posts extending away from the mounting surface to a distal end of the third mounting bracket and the fourth mounting bracket respectively; a hinge formed at the distal end of each of the third and the fourth mounting brackets; another DIN rail aligned with the DIN rail and supported above the mounting surface by the third and fourth mounting brackets through the respective hinge points such that the another DIN rail is rotatable about the hinge points along the axis of rotation to provide access to the wire passage extending parallel to the axis of rotation under the DIN rail and the another DIN rail through the first, second, third, and fourth mounting brackets.

18. The wiring system of claim 1 further comprising a wiring duct supported above the mounting surface and extending away from the DIN rail to enclose at least a portion of the wire passage.

19. The wiring system of claim 18 wherein the wiring duct includes a plurality of keys forming opposing walls extending away from the DIN rail and configured to receive wires extending from components mounted on the DIN rail into the wire passage.

20. The wiring system of claim 19 further comprising a support plate extending between the first and second mounting brackets to support the DIN rail, wherein the support plate includes a plurality of keys extending along a periphery of the support plate to coordinate with the plurality of keys forming the opposing walls of the wiring duct to receive and secure the wires extending from components mounted on the DIN rail into the wire passage.

21. The wiring system of claim 18 further comprising at least one removable cover engaged with the wiring duct.

22. A wiring system comprising:
a first mounting bracket and a second mounting bracket each having respective mounting flanges configured to secure the first and second mounting brackets to a mounting surface and each having first and second posts extending away from the mounting surface to a distal end to form a wire passage extending between the first and second posts; a support engaging at least one of the respective first and second posts of each of the first and second mounting brackets through at least one passage; and a DIN rail supported above the mounting surface and the wire passage by the first and second posts and the support such that the DIN rail is slidable on the support along the respective passages to move between a closed position restricting access to the wire passage extending under the DIN rail and an open position providing access to the wire passage.

23. The wiring system of claim 22 further comprising:
wherein the support includes at least one pin to thereby form a hinge by engaging at least one passage; and wherein the DIN rail is supported above the mounting surface by the first and second mounting brackets through the respective hinges such that the DIN rail is rotatable about the hinges along an axis of rotation extending between the first and second mounting brackets to provide access to a wire passage extending parallel to the axis of rotation under the DIN rail and through the first and second mounting brackets.

24. The wiring system of claim 23 wherein the first and second posts are separated by the wire passage and wherein the hinges are arranged at the distal end of the first post.

25. The wiring system of claim 24 further comprising first and second crossbars configured to engage the hinges at the first post of the first and second mounting brackets, respectively, and extend transversely across the first and second mounting brackets, respectively, to engage the second post of the first and second mounting brackets, respectively.

26. The wiring system of claim 25 wherein the DIN rail is supported by the first and second mounting brackets through the first and second crossbars.

27. The wiring system of claim 26 further comprising a lock formed at the distal end of the second post and configured to engage the crossbar to lock the DIN rail against rotation about the hinges.

28. The wiring system of claim 24 further comprising a lock formed at the distal end of the second post and configured to selectively secure the DIN rail against rotation about the hinges formed at the distal ends of the first post.

29. The wiring system of claim 24 further comprising a support plate extending between the first and second mounting brackets and supported by the distal end of the first and second posts and wherein the DIN rail is mounted to the support plate.

30. The wiring system of claim 29 further comprising a pin extending from at least one end of the support plate and a lock formed at the distal end of the second post to receive the pin and secure the DIN rail against rotation about the hinges formed at the distal ends of the first post.

* * * * *